(12) United States Patent
Ivanov et al.

(10) Patent No.: US 11,546,720 B2
(45) Date of Patent: Jan. 3, 2023

(54) SUPPORTING A TRACKING OF MOBILE DEVICES

(71) Applicant: HERE Global B.V., Eindhoven (NL)

(72) Inventors: Pavel Ivanov, Tampere (FI); Lauri Aarne Johannes Wirola, Tampere (FI); Jari Tapani Syrjarinne, Tampere (FI); Muhammad Irshan Khan, Tampere (FI)

(73) Assignee: HERE Gloabl B.V., Eindhoven (NL)

( * ) Notice: Subject to any disclaimer, the term of this patent is extended or adjusted under 35 U.S.C. 154(b) by 300 days.

(21) Appl. No.: 15/465,044

(22) Filed: Mar. 21, 2017

(65) Prior Publication Data

US 2018/0279067 A1 Sep. 27, 2018

(51) Int. Cl.
*H04W 4/02* (2018.01)
*H04W 4/33* (2018.01)
(Continued)

(52) U.S. Cl.
CPC .............. *H04W 4/02* (2013.01); *G01S 5/0252* (2013.01); *H04B 17/318* (2015.01);
(Continued)

(58) Field of Classification Search
CPC ... H04W 64/00; H04W 48/14; H04W 64/003; H04W 4/02; H04W 4/025; H04W 88/08; H04W 4/33; H04W 4/80; H04W 4/029; H04M 2242/30; H04B 17/318; G01S 5/0252
See application file for complete search history.

(56) References Cited

U.S. PATENT DOCUMENTS 7,085,588 B1 8/2006 Pfister et al.
9,121,922 B2 9/2015 Jarvis et al.
(Continued)

FOREIGN PATENT DOCUMENTS

EP 2807876 B1 3/2017
WO WO2011019125 A1 2/2011
WO WO2013110971 A1 8/2013

OTHER PUBLICATIONS

Covera Zone 2.1 User Manual, 2.1.0r1797, Published Feb. 2008, pp. 1-123.
(Continued)

*Primary Examiner* — Quoc Thai N Vu
(74) *Attorney, Agent, or Firm* — Lempia Summerfield Katz LLC

(57) ABSTRACT

An apparatus obtains results of measurements of a mobile device on radio signals transmitted by a radio transmitter at a site. The results include at least an identifier of the radio transmitter and an indication of a received signal strength of the radio signals. A plurality of radio transmitters are distributed at the site. The apparatus compares the received signal strength with a threshold. If the received signal strength exceeds the threshold, the apparatus causes a notification of a user of the mobile device, obtains an indication of a location based on a user input identifying a location on a map of the site, the map presented on a display of the mobile device, and causes storage of the identifier of the radio transmitter and the indication of the location as approximate location of the radio transmitter.

18 Claims, 6 Drawing Sheets

(51) Int. Cl.
  *H04W 4/029*   (2018.01)
  *G01S 5/02*    (2010.01)
  *H04B 17/318*  (2015.01)
  *H04W 4/80*    (2018.01)

(52) U.S. Cl.
  CPC ............ *H04W 4/029* (2018.02); *H04W 4/33* (2018.02); *H04W 4/80* (2018.02)

(56) References Cited

U.S. PATENT DOCUMENTS

| | | | |
|---|---|---|---|
| 9,198,003 B2 | 11/2015 | Marti et al. | |
| 2008/0248813 A1* | 10/2008 | Chatterjee | G01S 1/68 455/456.2 |
| 2013/0162481 A1* | 6/2013 | Parvizi | G01S 5/0205 342/452 |
| 2013/0288704 A1* | 10/2013 | Wirola | H04W 64/00 455/456.1 |
| 2014/0274116 A1 | 9/2014 | Xu et al. | |
| 2014/0335894 A1 | 11/2014 | Wirola | |
| 2015/0181372 A1 | 6/2015 | Huang et al. | |
| 2015/0296389 A1* | 10/2015 | Wirola | H04W 64/00 455/500 |
| 2016/0161592 A1 | 6/2016 | Wirola et al. | |
| 2017/0181115 A1* | 6/2017 | Kim | H04W 60/04 |
| 2018/0077535 A1* | 3/2018 | Todeschini | H04W 4/04 |

OTHER PUBLICATIONS

Gallagher, Thomas, et al. "Database updating through user feedback in fingerprint-based Wi-Fi location systems." Ubiquitous Positioning Indoor Navigation and Location Based Service (UPINLBS), 2010. IEEE, 2010.

Park, Jun-geun, et al. "Growing an organic indoor location system." Proceedings of the 8th international conference on Mobile systems, applications, and services. ACM, 2010.

PCT International Search Report and Written Opinion of the International Searching Authority dated Jul. 4, 2018 for corresponding PCT/EP2018/056878.

European Office Action for European Patent Application No. 18 713 171 .9-1213 dated Jul. 23, 2020.

European Office Action for European Patent Application No. 18 713 171.9 -1213 dated Dec. 22, 2020.

European Office Action for European Patent Application No. 18 713 171 .9-1213 dated Sep. 15, 2021.

Torres-Sospedra, Joaquin, et al. "UJIIndoorLoc: A New Multi-building and Multi-floor Database for WLAN Fingerprint-based Indoor Localization Problems." 2014 International Conference on Indoor Positioning and Indoor Navigation (IPIN). IEEE, Oct. 27, 2014. (pp. 1-10).

Vaughan-Nichols, Steven J. "How Google—and Everyone Else—Gets Wi-Fi Location Data." ZDNet, ZDNet, Nov. 16, 2011, https://www.zdnet.com/article/how-google-and-everyone-else-gets-wi-fi-location-data/. (pp. 1-13).

\* cited by examiner

SUPPORTING A TRACKING OF MOBILE DEVICES

FIELD OF THE DISCLOSURE

The disclosure relates to the field of positioning and more specifically to supporting a tracking of mobile devices at a particular site.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from a radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. A crowd-sourcing based training stage may enable an exhaustive survey of a site, for instance all floors, spaces and rooms of a building, in a short time at limited costs. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

An example embodiment of a method comprises obtaining results of measurements of a mobile device on radio signals transmitted by a radio transmitter at a site, the results comprising at least an identifier of the radio transmitter and an indication of a received signal strength of the radio signals, wherein a plurality of radio transmitters are distributed at the site. The method further comprises comparing the received signal strength with a threshold. The method further comprises, if the received signal strength exceeds the threshold, causing a notification of a user of the mobile device; obtaining an indication of a location based on a user input identifying a location on a map of the site, the map presented on a display of the mobile device; and causing storage of the identifier of the radio transmitter and the indication of the location as approximate location of the radio transmitter. The method may be performed by at least one apparatus.

An example embodiment of a first apparatus comprises means for causing performance of the actions of any embodiment of the presented method.

The means of the first apparatus may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus comprises at least one processor and at least one memory including computer program code, the at least one memory and the computer program code configured to, with the at least one processor, cause a device at least to perform the actions of any embodiment of the presented method. The device may, for instance, correspond to the apparatus or comprise the apparatus.

Any of the described apparatuses may comprise only the indicated components or one or more additional components.

Moreover an example embodiment of a system is presented, which comprises any embodiment of the presented first or second apparatus, for instance in the form of a server or a mobile device, and at least one further component. If the apparatus is a server, the system may further comprise for instance a memory that is configured to store identifiers of radio transmitters and associated indications of locations and that is accessible to the server and/or a mobile device providing results of measurements on radio signals at the site and/or a mobile device configured to calibrate its location for a sensor-based tracking using a plurality of identifiers of radio transmitters and associated indications of locations made available by the server for the site. If the apparatus is a mobile device, the system may further comprise for instance a server configured to cause storage of identifiers of radio transmitters and associated indications of locations provided by the mobile device and/or a mobile device configured to calibrate its location for a sensor-based tracking using a plurality of identifiers of radio transmitters and associated indications of locations made available by a server for the site.

Moreover an example embodiment of a non-transitory computer readable storage medium, in which computer program code is stored, is presented. The computer program code causes a device to perform the actions of any embodiment of the presented method when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting a tracking of mobile devices. In certain embodiment, any of the presented apparatuses is an apparatus for supporting a tracking of mobile devices.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
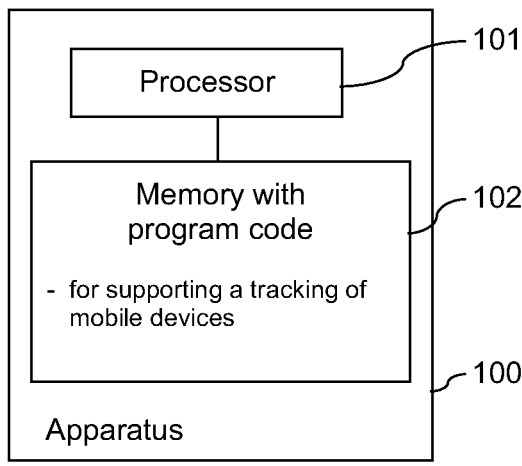
FIG. 1 is a schematic block diagram of an example embodiment of an apparatus.

FIG. 1 is a schematic block diagram of an example embodiment of an apparatus 100 according to the disclosure. Apparatus 100 comprises a processor 101 and, linked to processor 101, a memory 102. Memory 102 stores computer program code for supporting a tracking of mobile devices. The computer program code may be example computer program code according to the disclosure, and memory 102 may be an example computer readable medium according to the disclosure. Processor 101 is configured to execute computer program code stored in memory 102 in order to cause a device to perform desired actions.

Apparatus 100 may be a mobile device or a stationary device. A mobile device is configured to enable operation while the device is moving. It may be for instance a handheld mobile device, like a mobile communication device. A stationary device is configured to be stationary when in operation and/or fixed to a particular location. It may be for instance a server or any other kind of positioning support device. A stationary device may be ground based and thus stationary with respect to Earth or only stationary within a particular environment, like a ship. Apparatus 100 may equally be a module, like a chip, circuitry on a chip or a plug-in board, for a device. Optionally, apparatus 100 may comprise various other components, like a data interface, a user interface, a further memory, a further processor, etc.

An example operation of apparatus 100 will now be described with reference to the flow chart of FIG. 2. The operation is an example embodiment of a method according to the disclosure. Processor 101 and the program code stored in memory 102 cause a device to perform the operation when program code is retrieved from memory 102 and executed by processor 101. The device that is caused to perform the operation may be apparatus 100 or some other device, for example but not necessarily a device comprising apparatus 100.

The device obtains results of measurements of a mobile device on radio signals transmitted by a radio transmitter at a site. The results comprise at least an identifier of the radio transmitter and an indication of a received signal strength of the radio signals, wherein a plurality of radio transmitters are distributed at the site. (action 201) The mobile device may be for instance a handheld device. The device obtaining the results of measurements may be the mobile device or a component of the mobile device or a separate device.

The device furthermore compares the received signal strength with a threshold. (action 202) The plurality of radio transmitters distributed at the site may be of one or more types. The threshold may be the same for all considered radio transmitters. However, optionally a different threshold may be predefined for different types of radio transmitters; or thresholds may even be predefined individually for each transmitter. It is to be understood that comparing the received signal strength with a threshold may comprise comparing the indication of the received signal strength or a value derived from the indication with the threshold.

If the received signal strength exceeds the threshold, the device furthermore causes a notification of a user of the mobile device. (actions 203, 204) The notification may be for instance in the form of a vibration, a sound and/or a visual presentation and indicate to the user of the mobile device the presence of a strong signal and thus a near-by radio transmitter.

If the received signal strength exceeds the threshold, the device furthermore obtains an indication of a location based on a user input identifying a location on a map of the site, the map presented on a display of the mobile device. (actions 203, 205) The user may indicate for instance his own location or, if apparent to the user, the location of the radio transmitter.

If the received signal strength exceeds the threshold, the device furthermore causes storage of the identifier of the radio transmitter and the indication of the location as approximate location of the radio transmitter. (actions 203, 206) The data may be caused to be stored within the device or external to the device.

It is to be understood that depending on the implementation, it may also be checked whether the received signal strength is equal to or greater than the threshold.

Measurement based radio maps may enable a positioning at certain sites. A collection of data for a radio map for a site, which relies on survey persons inputting each location of measurement manually, is a laborious process and requires a lot of resources. Moreover, radio map data has to be constantly monitored and updated in order to capture changes in the radio environment and to maintain the positioning performance. Using crowd-sourcing techniques for indoor radio map data collection, on the other hand, may be complicated at certain sites, for instance indoors, since satellite signals may not be available for automatically obtaining locations of measurement, or they may provide location estimates with poor accuracy. One approach for crowd-sourcing is to initialize a localization process for a device performing the measurements outside a site based on satellite signals, and to track its location inside based on motion sensors of the device. Still, a GNSS position is not always accurate close to a building, that is, at a location where a crowd-sourcing process is usually initiated. Furthermore, sensor-based trajectory estimation accumulates errors rapidly.

Certain embodiments of the disclosure therefore provide that a number of reference locations at a site are assembled by means of one or more mobile devices, for instance before an actual crowd-sourcing process is started. A user of a mobile device may move around at the site and be notified whenever the mobile device detects radio signals that have a signal strength exceeding a predetermined threshold. This indicates to the user that the radio transmitter transmitting the radio signals is near-by. The user indicates the current position on a map that is presented on a display of the mobile device. With a suitable threshold, it may be assumed that the radio transmitter is 1-3 meters off the user's current position at the most. Alternatively, for instance if the user sees the radio transmitters, the user may indicate the actual location of the radio transmitter on the map. The location may be stored along with an identity of the radio transmitter.

Certain embodiments of the disclosure may have the effect that they enable a generation of a simple database providing reference locations for a site. Certain embodiments of the disclosure may have the effect that they enable a regular recalibration of the position of a further mobile device, for instance for a sensor-based tracking of the further mobile device at a site.

Figure 2:
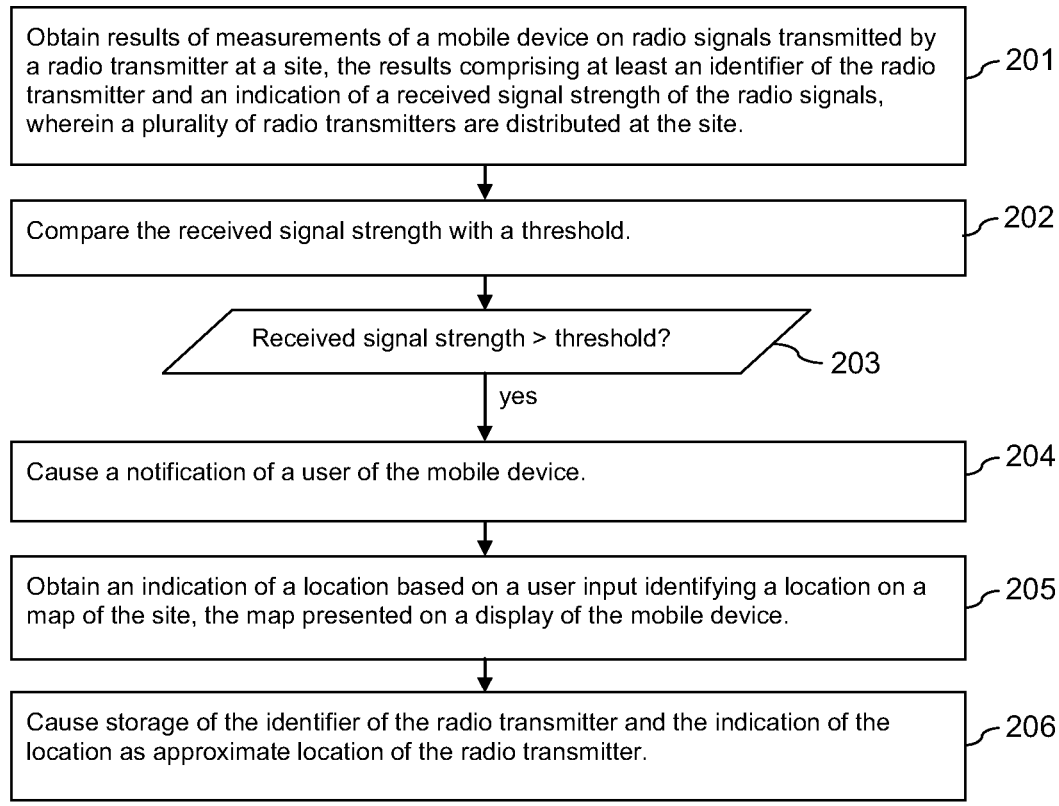
FIG. 2 is a flow chart illustrating an example embodiment of a method.

Apparatus 100 illustrated in FIG. 1 and the method illustrated in FIG. 2 may be implemented and refined in various ways.

The site may be an indoor site, but it may equally be an outdoor site or comprise outdoor areas.

An indication of a received signal strength of radio signals may be for instance a received signal strength indication (RSSI) or a physical Rx level in dBm with a reference value of 1 mW, etc. Another kind of indication of a received signal strength of radio signals may be for instance an indication of a path loss of a radio signal at a particular location.

The considered radio transmitters that are distributed at the site may comprise any kind of terrestrial transmitter, in particular, though not exclusively, any kind of non-cellular terrestrial transmitter. In example embodiments, the radio transmitters comprise a wireless local area network access point and/or a Bluetooth beacon and/or a Bluetooth beacon enabling Bluetooth low energy mode and/or a Bluetooth low energy beacon.

WLAN access points and Bluetooth beacons are already installed in many buildings. Furthermore, WLAN and Bluetooth technologies are supported by many mobile user devices by default, like by most smartphones, tablets, laptops and feature phones. Evaluating the received signal strength of signals transmitted by WLAN access points, Bluetooth beacons and/or BLE beacons may thus have the effect that the determined reference locations may be based in some embodiments on an existing infrastructure in buildings and/or be exploited with existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The radio transmitters may be stand-alone devices or be integrated into or attached to some other device. The use of Bluetooth low energy may limit the energy consumption at all involved devices. A Bluetooth beacon that is employed for the disclosure may be any kind of Bluetooth beacon complying with any present or future standard.

It is to be understood, however, that other types of radio transmitters than variations of WLAN access points or Bluetooth beacons may be used as well, for instance tags or other devices that are configured to transmit ultra-wideband (UWB) signals or ultra-sound signals or any wireless signals that might emerge in the future.

If the radio transmitters comprises alternatively or in addition a cellular transmitter, any of the radio transmitters may be for instance a base station of a Global System for Mobile Communications (GSM) network, of a CDMA2000 network, of a Universal Mobile Telecommunications System (UMTS) network, of a long term evolution (LTE) network, or of any other current or future kind of cellular network.

In example embodiments, the identifier of the radio transmitter and the indication of the location are caused to be stored in a database that is configured to store identifiers of a plurality of radio transmitters and a respectively associated indication of a location. This may have the effect that a sensor-based tracking of a further mobile device may be re-calibrated at several locations of a site based on the stored data, or that a further mobile device may be tracked roughly based on the stored data when passing the locations.

It is to be understood that such a database may be configured to store data for one or more sites.

In example embodiments, the indication of the received signal strength may be caused to be stored along with the location and the identifier of the radio transmitter. This may have the effect that in case several measurement results are provided for the same radio transmitter within a limited period of time, the location that is associated with the highest received signal strength may be stored as the location that is likely to be closest to the actual location.

In example embodiments, the notification of a user is only caused in case the received signal strength of radio signals of a single radio transmitter is determined to exceed a threshold at a current location of the mobile device. In other example embodiments, the notification of a user is only caused in case the received signal strength of radio signals of at least one radio transmitter of a single entity is determined to exceed a threshold at a current location of the mobile device. The latter approach may be used, if several radio transmitters at the site may belong to a single entity and thus be arranged at the same location, for example in the case of a WLAN component using Multiple Input Multiple Output (MIMO) technology. Both approaches may have the effect that using the stored location as a reference location may be unambiguous. In other example embodiments, the notification of a user may be caused in case the received signal strength of radio signals of at least one radio transmitter is determined to exceed a threshold at a current location of the mobile device. With the latter approach, a user may thus be notified as well, if the user is close to two or more separate radio transmitters that happen to be arranged next to each other. In case the notification of a user is to be caused when the received signal strength of radio signals of two or more radio transmitters is determined to exceed a threshold, an indication of a location that is based on a user input may be caused to be stored as approximate location of each of the radio transmitters along with the identifier of each of the radio transmitters.

In example embodiments, the map of the site is caused to be presented to a user with a segmentation into sub-areas. Location information for a limited number of radio transmitters, when distributed uniformly at the site, may be sufficient to enable calibrations for an accurate sensor-based tracking of mobile devices. For instance, it may be an aim to determine the location of a subset of 10% of the radio transmitters at the site. An indication of sub-areas may support a user of the mobile device in collecting location information for a sufficient number of radio transmitters with a suitable distribution at the site. These embodiments may thus have the effect of avoiding a waste of time of the user and to ensure at the same time a useful distribution of collected data.

In example embodiments, sub-areas, for which an approximate location of at least one radio transmitter is still required, are pointed out on the display and/or sub-areas, for which a predetermined number of approximate locations of radio transmitters has already been stored, are pointed out on the display. This may have the effect of further supporting the user. The sub-areas may be pointed out for instance by coloring. Sub-areas in which a location of a radio transmitter is still needed may be colored reddish and/or sub-areas in which a location of a radio transmitter is not needed anymore may be colored greenish. It is to be understood that any other coloring may be used just the same. Furthermore, the use of colors is not required; a sub-area could also be pointed out for instance by cross hatching, greying out, use of bold lines, etc.

In example embodiments, the stored identifier of the radio transmitter and the stored indication of the location are made available for a tracking of further mobile devices at the site. For instance, though not necessarily, it may be used for a calibration of a sensor-based tracking of further mobile devices collecting fingerprints at the site in the scope of a crowd-sourcing process.

In example embodiments, presented actions may be performed by at least one apparatus. The at least one apparatus comprises the mobile device or a component of the mobile device; or a server receiving results of measurements from at least one mobile device; or a component of a server receiving results of measurements from at least one mobile device. Determining the approximate locations of radio transmitters at the mobile device may have the effect that a transmission of measurement results is not needed. If desired, a final set of collected approximate locations of several radio transmitters at the site may be transmitted to a server for storage and for distribution to other devices, in particular mobile devices participating in a crowd-sourcing process. Determining the approximate locations of radio transmitters at a server may have the effect that the mobile device performing the measurements uses less processing power and less storage space for the process.

In example embodiments, the identifier of the radio transmitter and the indication of the location are stored in a memory as a part of a plurality of identifiers of radio transmitters and associated indications of locations at the site. A further mobile device may then receive the plurality of identifiers of radio transmitters and the associated indications of locations stored for the site; calibrate a position of the further mobile device using an indication of a location associated with an identifier of a radio transmitter, if radio signals of the radio transmitter are received with a signal strength exceeding a threshold; and use the calibrated position for a sensor-based tracking of the further mobile device. This may have the effect that the location of the further mobile device may be re-calibrated repeatedly when moving around at the site. The data may be stored in the memory as a part of a database. It is to be understood that the mobile device that is used for collecting the reference locations may also be configured to operate as further mobile device.

In example embodiments, such a further mobile device may furthermore assemble fingerprints, each fingerprint comprising results of measurements on radio signals at a respective location of measurement at the site and an indication of the respective location of measurement, wherein the respective location of measurement is based on the sensor-based tracking of the further mobile device. Assembled fingerprints may be transmitted separately or collectively to a server. The fingerprint data may be used by the server to generate radio models and/or at least one radio map for the site. The results of measurements may comprise for instance an identifier of at least one radio transmitter and an associated indication of a received signal strength.

Figure 3:
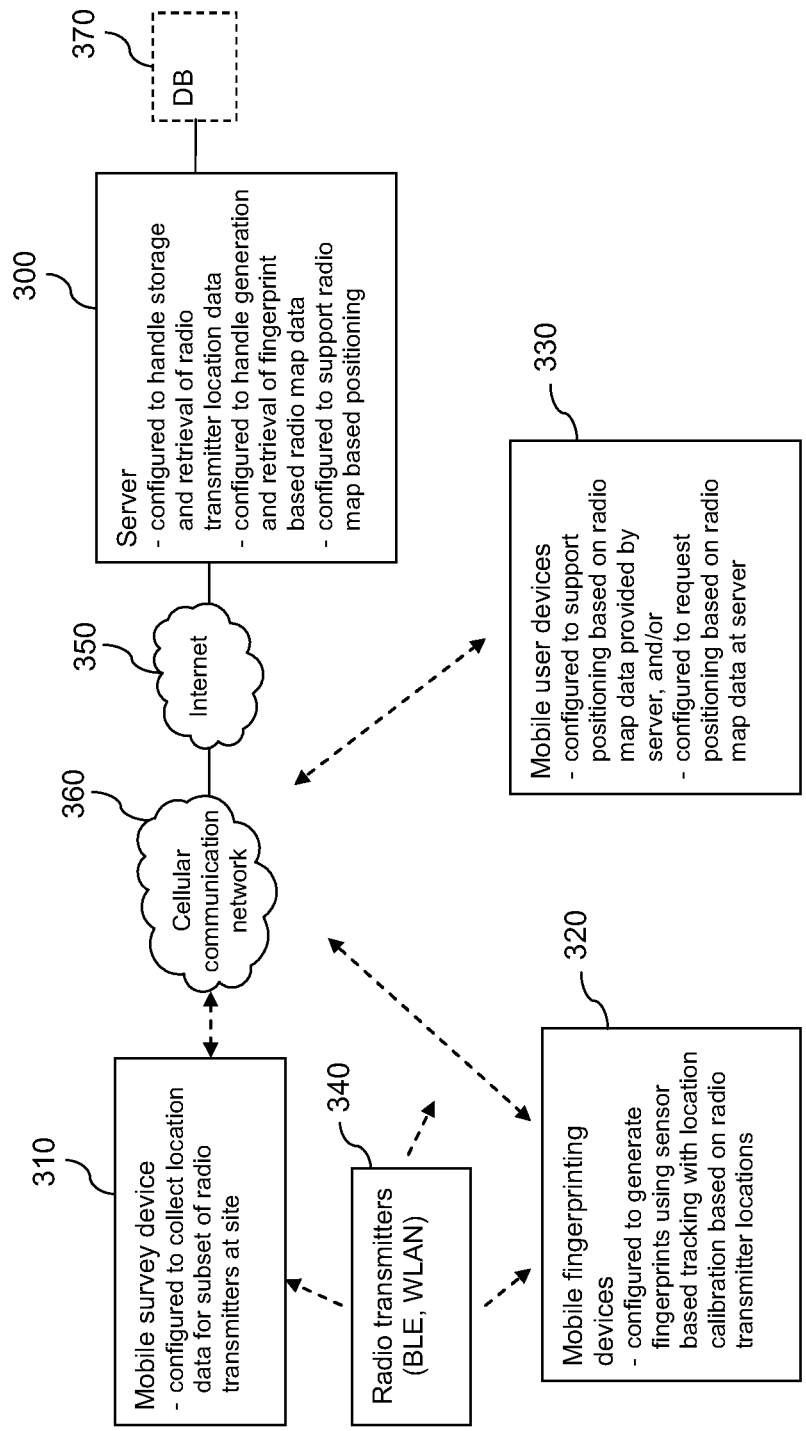
FIG. 3 is a schematic block diagram of an example embodiment of a system.

FIG. 3 is a schematic block diagram of an example embodiment of a system supporting sensor-based tracking of mobile devices that participate in a crowd-sourcing process at a certain site, for instance in a large building like a shopping-mall.

The system comprises a server 300, a mobile survey device 310, mobile fingerprinting devices 320 and mobile user devices 330. It is to be understood that a mobile device may support any combination of the functions associated with devices 310, 320 and 330. The system further comprises a plurality of radio transmitters 340. The Internet 350 may enable a connection between server 300 and other devices. Server 300 may optionally be connected to an external database 370.

Server 300 may be for instance a dedicated location server or a general purpose server. It is configured to handle storage and retrieval of radio transmitter location data for one or more sites. In addition, it may be configured to handle generation and retrieval of fingerprint based radio map data for one or more sites. In addition, it may be configured to support radio map based positioning for one or more sites.

Mobile survey device 310 is configured to collect location data for a subset of radio transmitters 340 at the site, for instance as a preparation for a crowd sourcing process. Mobile survey device 310 may be for instance a regular mobile terminal, like a smartphone or general purpose tablet PC, or a dedicated survey device. The user of mobile survey device 310 may belong to special survey personnel.

Mobile fingerprinting devices 320 are configured to generate fingerprints for radio signals transmitted by radio transmitters 340. They are furthermore configured to perform a sensor-based tracking that is calibrated with approximate locations of a subset of the radio transmitters 340 in order to determine measurement locations for the fingerprints. Any of mobile fingerprinting devices 320 may be for instance a regular mobile terminal, like a smartphone or general purpose tablet PC. The mobile fingerprinting devices 320 may belong to any user who is willing to support the generation of radio map data for the site.

Mobile user devices 330 represent devices that may desire to know their own position at the site. The position may be requested for instance by an internal application or by some other device. Any of mobile user devices 330 may be for instance a regular mobile terminal, like a smartphone or general purpose tablet PC, or it may be for instance an Internet of Things (IoT) device, like a smart watch or a smart band, etc. It is configured to perform measurements on signals transmitted by at least one type of radio transmitters 340. It is further configured to compute its own position based on radio map data provided by server 300 or to obtain a computed position from server 300 upon request.

Any of mobile devices 310, 320, 330 may be configured to access server 300 for instance via a cellular communication network 360 or some WLAN and the Internet 350.

The radio transmitters 340 may be for instance WLAN access points of at least one WLAN and/or BLE beacons. They may be distributed at the site such that at least one radio transmitter may be observed at essentially each location of the site at which a positioning of mobile user devices 330 is to be supported. Each of the radio transmitters 340 may be configured to transmit radio signals at regular intervals. The radio signals are to be used for positioning purposes of mobile user devices 330. Optionally, they may be used for other purposes in addition.

Figure 4:
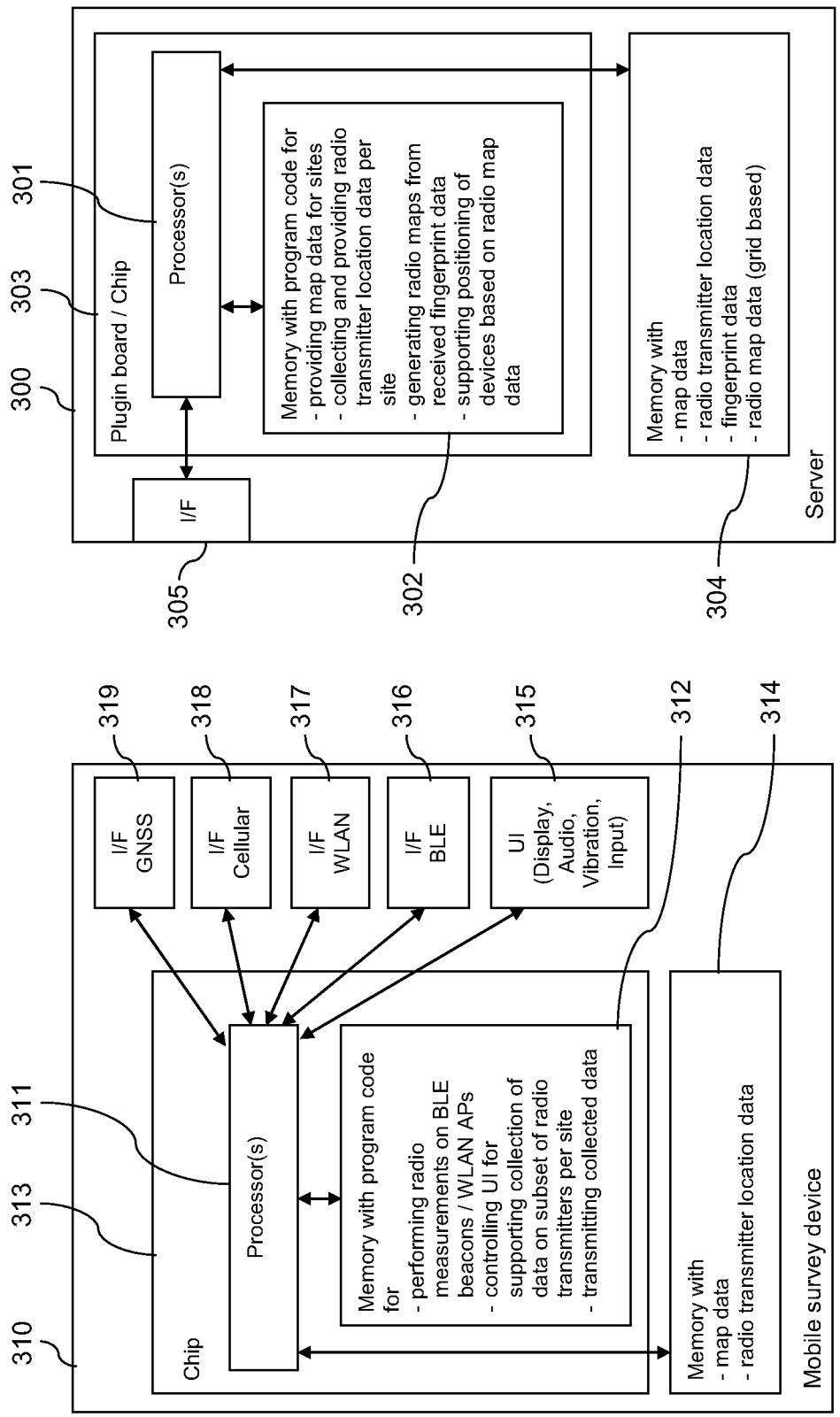
FIG. 4 is a schematic block diagram presenting example details of components of the system of FIG. 3.

FIG. 4 are schematic block diagrams of an example server 300 and an example mobile survey device 310.

Server 300 comprises a processor 301 that is linked to a first memory 302, to a second memory 304, and to an interface 305.

Processor 301 is configured to execute computer program code, including computer program code stored in memory 302, in order to cause server 300 to perform desired actions. It is to be understood that processor 301 may comprise or have access to a working memory for this purpose, for example in the form of a random access memory (not shown).

Memory 302 stores computer program code for providing map data for one or more sites, computer program code for collecting and providing radio transmitter location data per site, computer program code for generating radio maps based on received fingerprint data, and computer program code for supporting a positioning of mobile user devices 330 based on generated radio map data. Memory 302 may also store any other kind of computer program code. Memory 302 may also store for instance an operating system for server 300. In addition, memory 302 may store any kind of data.

Processor 301 and memory 302 may optionally belong to a module 303, like a plug-in board or a chip or an integrated circuit or any other kind of processing circuitry, which may comprise in addition various other components, for instance a further processor or a further memory.

Memory 304 is configured to store data, including for example map data for one or more sites, radio transmitter location data, received fingerprint data, and grid based radio map data. In addition, memory 304 may also store any other kind of data. It is to be understood that memory 304 could also be external to server 300. Some or all of the data may be stored for instance in database 370.

Interface 305 is configured to enable a communication with other devices, for instance via the Internet 350.

It is to be understood that server 300 may comprise various other components, like a user interface.

Mobile survey device 310 comprises a processor 311 that is linked to a first memory 312, to a second memory 314, to a user interface (UI) 315, to a BLE interface (I/F) 316, to a WLAN interface 317 and/or a cellular interface 318 and optionally to a GNSS interface 319.

Processor 311 is configured to execute computer program code, including computer program code stored in memory 312, in order to cause mobile survey device 310 to perform desired actions. It is to be understood that processor 311 may comprise or have access to a working memory for this purpose, for example in the form of a random access memory (not shown).

Memory 312 stores computer program code for controlling measurements on radio signals of radio transmitters 340 and for processing measurement results, computer program code for controlling user interface 315 for supporting a systematic collection of data about a subset of radio transmitters 340, and computer program code for causing transmission of collected data to server 300. Memory 312 may also store any other kind of computer program code. Memory 312 may also store for instance an operating system for mobile survey device 310. In addition, memory 312 may store any kind of data.

Processor 311 and memory 312 may optionally belong to a module 313, like a chip or an integrated circuit or any other kind of processing circuitry, which may comprise in addition various other components, for instance a further processor or a further memory.

Memory 314 is configured to store data, including for example map data for one or more sites and radio transmitter location data for one or more sites. In addition, memory 314 may also store any other kind of data.

User interface 315 comprises a display and user input means, for instance a touch screen. In addition, it may comprise various other components, like a loudspeaker, a vibration mechanism, keys and/or buttons.

BLE interface 316 is configured to receive radio signals transmitted by BLE beacons 340.

WLAN interface 317 is configured to communicate with WLAN access points 340. WLAN interface 317 may be provided alternatively or in addition to BLE interface 316.

Cellular interface 318 is configured to communicate with nodes of cellular communication network 360. Cellular interface 318 may be provided alternatively or in addition to WLAN interface 317.

WLAN interface 317 and/or cellular interface 318 may enable mobile survey device 310 to access server 300 via the Internet 350.

GNSS interface 319 may comprise any kind of global navigation satellite signal receiver, for example a GPS receiver and/or a GLONASS receiver and/or a GALILEO receiver. It may be configured to receive corresponding satellite signals and to determine the current position of mobile survey device 310 based on the signals, possibly using provided assistance data. GNSS interface 319 is an optional component.

It is to be understood that mobile survey device 310 may comprise various other components.

Mobile survey device 310 or module 313 may be an example embodiment of an apparatus according to the disclosure.

Mobile fingerprinting devices 320 and mobile user devices 330 may have the same structure as presented for mobile survey device 310, except that the computer program codes in memory 312 and the stored data in memory 314 may be different or supplemented.

Furthermore, at least mobile fingerprinting devices 320 comprise in addition sensors that enable a tracking of mobile fingerprinting devices 320 relative to a known reference location. The sensors may comprise for instance motion sensors, accelerometers, gyroscopes, magnetometers and/or barometers, etc.

Figure 5:
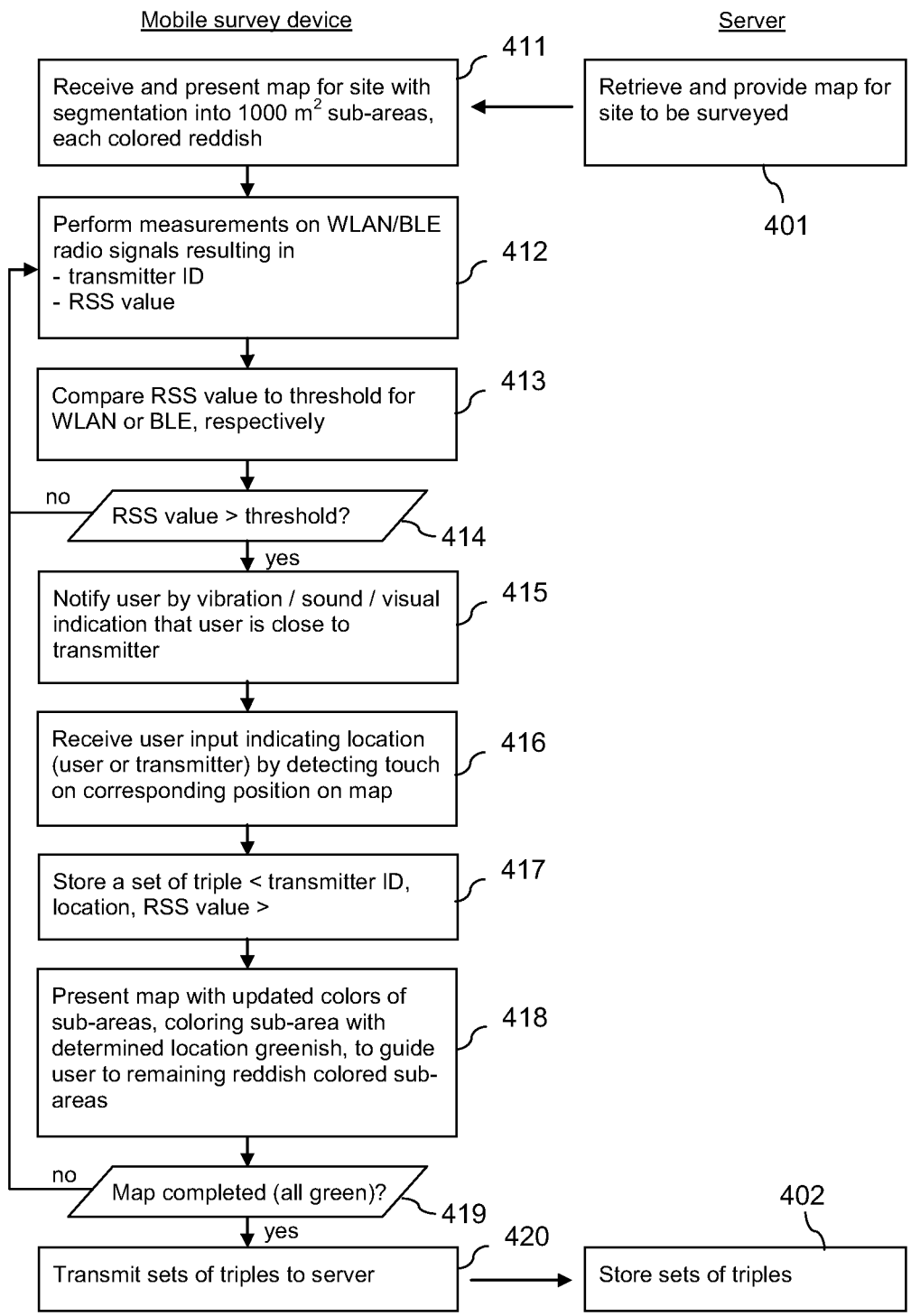
FIG. 5 is a flow chart illustrating an example embodiment of operations in the system of FIG. 3.
Figure 6:
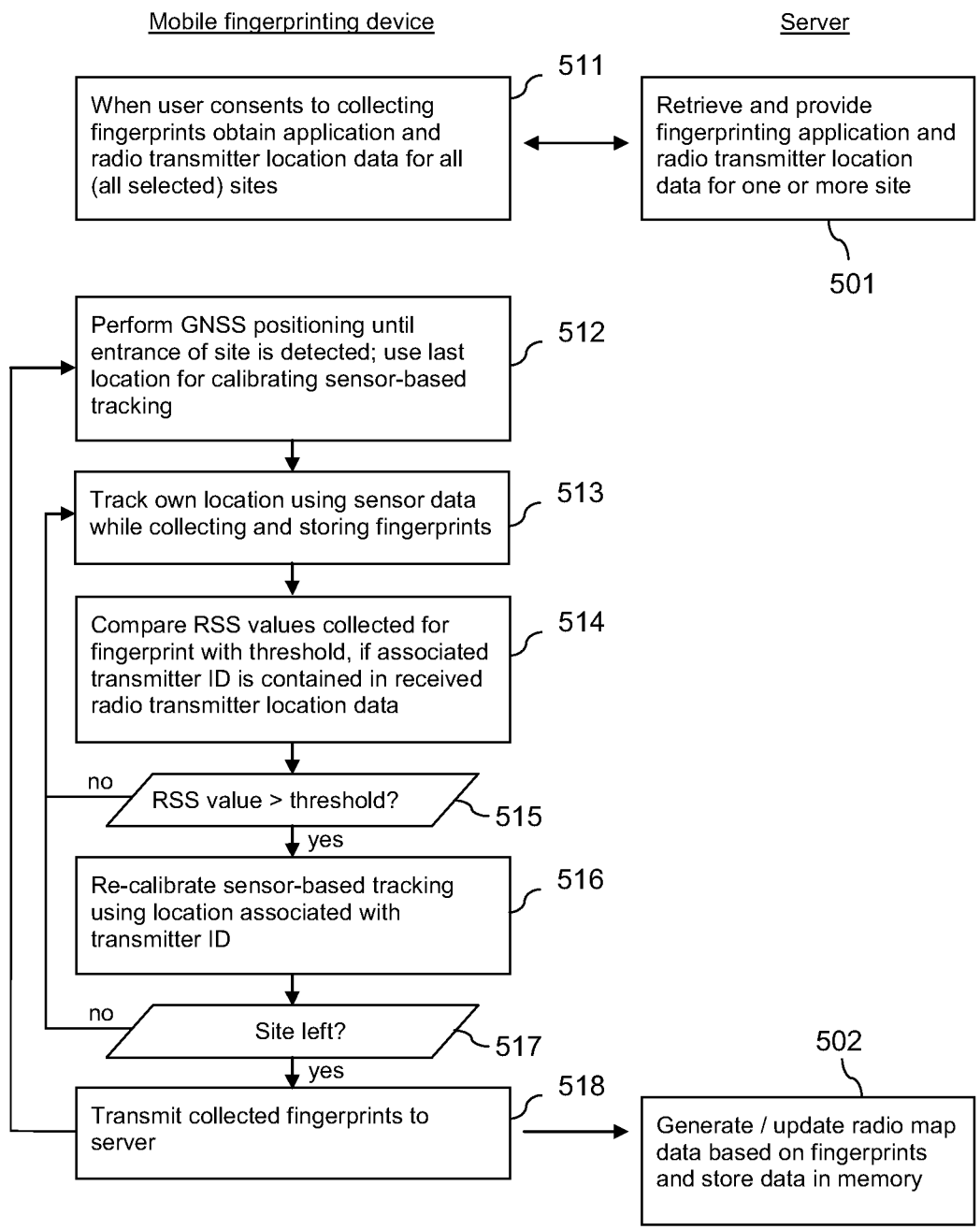
FIG. 6 is a flow chart illustrating an example embodiment of further operations in the system of FIG. 3.
Figure 7:
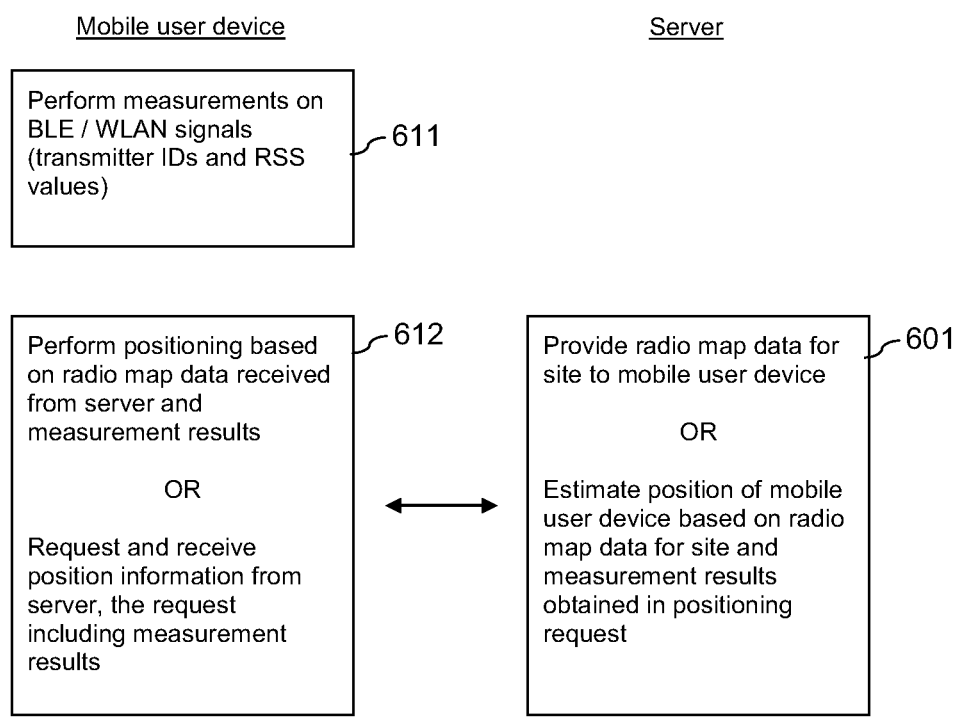
FIG. 7 is a flow chart illustrating an example embodiment of further operations in the system of FIG. 3.

FIGS. 5-7 illustrate example operations in the system of FIG. 3.

FIG. 5 is a flow chart illustrating first example operations in the system of FIG. 3. The purpose of the operations of FIG. 5 is to determine reference locations at the site to enable a sensor-based tracking of mobile devices at the site. Processor 311 and some of the program code stored in memory 312 may cause mobile survey device 310 to perform the actions presented on the left hand side when the program code is retrieved from memory 312 and executed by processor 311. Processor 301 and some of the program code stored in memory 302 may cause server 300 to perform the actions presented on the right hand side when the program code is retrieved from memory 302 and executed by processor 301. Sever 300 may perform corresponding actions separately for each of a plurality of localization sites.

At the site, all radio transmitters 340 regularly transmit radio signals including at least their identifier (ID). The identifier may be for instance a medium access control (MAC) address of a transmitting BLE beacon or of a WLAN access point. The transmission power may be set to a fixed value, at least per type of radio transmitter. Approximate locations of a subset of all radio transmitters 340 are to be determined as reference locations for the site.

When reference locations for a site are to be determined, server 300 retrieves map data for the site from memory 304 and provides the map data to mobile survey device 310. (action 401) The map data may be provided for instance upon request of mobile survey device 310 when the user activates a survey application corresponding to some of the program code in memory 312.

Mobile survey device 310 receives the map data and applies a segmentation into sub-areas to the represented map. Each sub-area may have a size of approximately 1000 $m^2$. It is to be understood, though, that any other size may be selected as well. Mobile survey device 310 presents a site map defined by the received map data to the user on the display of user interface 315 with an indication of the sub-areas, for example in the form of a superimposed grid. At this stage, each of the sub-areas may be colored reddish. A reddish sub-area may indicate to the user that at least one reference location is still required in this sub-area. (action 411)

The user of mobile survey device 310 moves around in a first sub-area of the site. Mobile survey device 310 scans for radio signals from radio transmitters 340 in the environment at regular intervals. Whenever it detects radio signals of at least one radio transmitter 340 during a scan, it measures the received signal strength (RSS) of the radio signals and extracts an identifier of the transmitting radio transmitter from the radio signals. (action 412)

Mobile survey device 310 compares each RSS value with a predetermined threshold. The threshold may be set differently for BLE signals and WLAN signals due to different transmission powers. It may be for instance set in each case such that the threshold can be expected to be exceeded if mobile survey device 310 is at the most at a distance of 1-3 meters from the radio transmitter 340. (action 413)

If none of the RSS values exceeds the threshold, mobile survey device 310 may continue performing measurements. (actions 414, 412)

If an RSS value exceeds the threshold, in contrast, mobile survey device 310 notifies the user that the user is close to one of the radio transmitters 340. Mobile survey device 310 may activate a vibration mechanism, output a sound or present a visual indication to this end. (actions 414, 415) It may be noted that the notification is only caused, in case the RSS value of radio signals of a single radio transmitter exceed the threshold. If the RSS values of radio signals of more than one radio transmitter exceed the threshold at a current location, mobile survey device 310 may continue with action 412.

The notification constitutes a request to the user to indicate a location on the map that is presented on the display. In the case of a touch screen, the selection may be performed by touching the location on the screen. The indicated location may be the user location or—if apparent to the user—the location of the radio transmitter. Mobile survey device 310 detects the touch at a particular position on the screen and receives thereby the user input indicating a location corresponding to the touched position on the presented map. (action 416)

Mobile survey device 310 thereupon stores the obtained data as a set of a triple<transmitter ID, location, RSS value>in memory 314. (action 417) The location is assumed to constitute an approximate location of a near-by radio transmitter 340.

In addition, mobile survey device 310 presents the map with updated colors for the sub-areas. More specifically, the sub-area with the registered approximate location of the radio transmitter 340 is colored greenish. Thereby, the user is guided for further measurements to the remaining reddish colored sub-areas. (action 418) It is to be understood that it may also be required to determine the approximate location of two or more radio transmitters 340 in a sub-area, before its representation on the display is colored greenish.

As long as there are still reddish colored sub-areas of the map presented on the display of mobile survey device 310, mobile survey device 310 may continue performing measurements, while the user is moving (to and) through a next sub-area. (actions 419, 412)

When all sub-areas of the map presented on the display of mobile survey device 310 are of greenish color, mobile survey device 310 stops the measurements for the site and transmits all sets of triples that have been stored for the site to server 300. (actions 419, 420)

Server 300 receives the sets of triples and stores them in memory 304, which may provide the storage space of a database configured to store the sets of triples. (action 402) The sets of triples constitute approximate radio transmitter location data for a subset of all radio transmitters 340 that are distributed at the site and that are available for positioning. It is ensured that each radio transmitter ID appears only once in memory 304. In case several sets of triples are received for the same radio transmitter ID, only the set of triples with the strongest indicated RSS value is kept and stored. In some embodiments, sets of triples for about 10% of the radio transmitters 340 may be considered sufficient for enabling a reliable sensor-based tracking at the site and thus to enable for example, though not necessarily, a crowd-sourced collection of fingerprints as a basis for radio map data.

It is to be understood that the operations of FIG. 5 may be repeated from time to time in order to update the radio transmitter location data.

FIG. 6 is a flow chart illustrating further example operations in the system of FIG. 3, the operations making use of the reference locations assembled in the operations of FIG. 5. The purpose of the operations of FIG. 6 is to collect data enabling a generation of a radio map for the site based on fingerprints that are assembled by mobile fingerprinting devices 320. A mobile fingerprinting device 320 may be caused by stored computer program code to perform the actions presented on the left hand side. The stored computer program code is retrieved from an internal memory and executed by an internal processor. Processor 301 and some of the program code stored in memory 302 may cause server 300 to perform the actions presented on the right hand side when the program code is retrieved from memory 302 and executed by processor 301. Sever 300 may perform corresponding actions separately for each of a plurality of localization sites.

When a user of a mobile device consents to collecting fingerprints at one or more sites, the mobile device obtains a suitable fingerprinting application and a set of radio transmitter location data for each of the sites from server 300. As a result, the mobile device is suited to act as a mobile fingerprinting device 320. (actions 511, 501)

A GNSS interface of mobile fingerprinting device 320 may track the position of mobile fingerprinting device 320 based on received satellite signals whenever possible. One of the sites at which fingerprints are to be collected may be an indoor site, though. Mobile fingerprinting device 320 may register the last GNSS based location before entering a building of the site (and before satellite signals are lost) as a first reference location. The reference position may be used for calibrating a sensor-based tracking of mobile fingerprinting device 320. (action 512) Mobile fingerprinting device 320 may know from the reference position that the entered site is one of the sites at which fingerprints are to be collected. Alternatively, the collection may be activated manually by the user.

The user of mobile fingerprinting device 320 moves around at the site as desired. Mobile fingerprinting device 320 tracks its own position using its sensors. At the same time, mobile fingerprinting device 320 scans for radio signals from radio transmitters 340 in the environment at regular intervals. Whenever it detects radio signals from at least one radio transmitter 340 during a scan, it measures the received signal strength (RSS) of the radio signals and extracts an identifier (ID) of the transmitting radio transmitter from the radio signals. Mobile fingerprinting device 320 assembles a fingerprint indicating the current location derived from the sensor-based tracking, the ID of all radio transmitters from which signals have been detected at the current location, and the associated RSS values. Mobile fingerprinting device 320 stores the assembled fingerprint in an internal memory. (action 513)

If any of the transmitter IDs that is included in a fingerprint is contained in the received and stored radio transmitter location data, mobile fingerprinting device 320 compares in addition the associated RSS value with a predetermined threshold. (action 514) Again, different thresholds may be predetermined for different types of radio transmitters 340.

If no RSS value associated with a coinciding radio transmitter ID exceeds the threshold, mobile fingerprinting device 320 continues with action 513 using the previous calibration of the sensor-based tracking. (actions 515)

If an RSS value associated with a particular transmitter ID exceeds the threshold, in contrast, mobile fingerprinting device 320 determines the location that is associated with the transmitter ID in the received and stored radio transmitter location data. The location is used as a new reference location for a re-calibration of the sensor-based tracking of mobile fingerprinting device 320. (actions 515, 516) The new reference location can be assumed to be a reliable estimate, since the area where strong signals from WLAN access points or BLE beacons can be detected is small; it may be assumed to be within 1-3 meters from the true location of the radio transmitter 340, if a suitable threshold is selected.

If mobile fingerprinting device 320 did not leave the site in the meantime (and the user did not deactivate the fingerprinting application), mobile fingerprinting device 320 continues with action 513. (action 517)

When mobile fingerprinting device 320 is detected to leave the site, which may be detected for instance based on a user input or based on a new GNSS based position, mobile fingerprinting device 320 retrieves all collected fingerprints from the internal memory and transmits them to server 300. (actions 517, 518) The transmission may take place for instance via the cellular network 360 or a WLAN and the Internet 350.

Server 300 receives batches of fingerprints for the site from a plurality of mobile fingerprinting devices 320. The fingerprints may be stored in memory 304 at least until a certain number of fingerprints is available for the site.

Server 300 then generates a grid based radio map based on all fingerprints stored in memory 304 for the site. The grid is defined to cover the site such that each grid point corresponds to a geographical location at the site. If the localization site comprises several floors, a separate grid may be defined for each floor, or a single three dimensional grid may be defined with one dimension for the different floors. A radio map may be generated by mapping the RSS value(s) and the associated radio transmitter ID(s) of each fingerprint to the grid point that corresponds to a geographical location that is closest to the measurement location indicated in the fingerprint. If there are several RSS values for the same radio transmitter 340 that would be mapped to the same grid pint, some kind of average value may be used, for instance the arithmetic mean or the median value. For grid points to which no RSS values could be mapped due to missing fingerprints from the corresponding areas at the localization site, RSS values may be generated by interpolating surrounding RSS values if possible, and by extrapolating neighboring RSS values otherwise. Alternatively, the original or mapped RSS values could be used for estimating for each radio transmitter 340 parameter values for a path loss model, and the pass loss model could then be used for mapping all or missing RSS values to grid points of the grid. Server 300 stores the radio map data in memory 304 or in some external memory 370. (action 502)

It is to be understood that server 300 may also update an existing radio map based on newly received fingerprints.

FIG. 7 is a flow chart illustrating further example operations in the system of FIG. 3. The purpose of the operations of FIG. 7 is to position the mobile user device using the radio map data generated with the operations of FIG. 6 for the site. A mobile user device 330 is caused by stored computer program code to perform the actions presented on the left hand side. The stored computer program code is retrieved from an internal memory and executed by an internal processor. Processor 301 and some of the program code stored in memory 302 may cause server 300 to perform the actions presented on the right hand side when the program code is retrieved from memory 302 and executed by processor 301.

For instance, some application of a mobile user device 330 may have to know the position of mobile user device 330 at a particular site.

In this case, mobile user device 330 may scan for radio signals at its current position and perform measurements on detected radio signals of one or more of radio transmitters 340. The results of the measurements comprise an RSS value for detected signals of one or more radio transmitters and an associated radio transmitter ID. (action 611)

Mobile user device 330 may assemble the measurement results and transmit them in a message to server 300 along with a positioning request. Server 300 may then estimate the position of mobile user device 330 based on the received measurement results and a radio map for the site generated or updated in action 502 of FIG. 6. Server 300 may transmit the estimated position to the requesting mobile user device 330. The estimated position may then be provided for use by the application of mobile user device 330 requesting the position. The application may present the estimated position for instance to a user of mobile user device 330 via a display. Alternatively, mobile user device 330 may request and receive radio map data for a certain site from server 300, in order to be able to continuously estimate its own position based on the received radio map data and on results of scans for radio signals at the site. In this case, server 300 may retrieve and provide the data of the radio map for the site to the requesting mobile device 330. (actions 612, 601)

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified.

For example, in an alternative embodiment, at least some of mobile devices 310, 320, 330 may not contain a GNSS interface. In the operation of FIG. 6, action 512 may then be omitted, and a tracking of the device and a storing of fingerprints in action 513 may only start in the iterations once a sensor-based tracking has been calibrated for the first time in action 516.

For example, whether the site is left (action 517) may be determined in the operations of FIG. 6 at any desired time other than or in addition to a time between actions 516 and 518.

For example, in an alternative embodiment, the radio transmitters may include for example other transmitters than BLE beacons or WLAN access points, for example regular Bluetooth transmitters or ultra-sound transmitters, etc.

For example, in an alternative embodiment, the re-calibration of a sensor-based tracking by means of reference locations indicating the approximate locations of radio transmitters at a site may not only be used for a device tracking in the scope of a collection of fingerprints (as described with reference to FIG. 6), but also for a sensor-based tracking of a device for any other purpose. In some embodiments, reference locations indicating the approximate locations of radio transmitters at a site may even be used for tracking devices based on radio signals only, without using sensors.

Summarized, certain embodiments of the disclosure may enable a determination of reference locations for a sensor-based tracking of mobile devices, when reliable GNSS based positioning is not possible. As a subset of approximate locations of radio transmitters distributed at a site may be sufficient as reference locations, the required user involvement is limited. A comprehensive radio data collection at a site may then be carried out automatically by mobile devices without any user involvement.

The following embodiments of the invention are also disclosed:

Embodiment 1

A method comprising, performed by at least one apparatus:
   obtaining results of measurements of a mobile device on radio signals transmitted by a radio transmitter at a site, the results comprising at least an identifier of the radio transmitter and an indication of a received signal strength of the radio signals, wherein a plurality of radio transmitters are distributed at the site;
   comparing the received signal strength with a threshold; and
   if the received signal strength exceeds the threshold:
      causing a notification of a user of the mobile device;
      obtaining an indication of a location based on a user input identifying a location on a map of the site, the map presented on a display of the mobile device; and
      causing storage of the identifier of the radio transmitter and the indication of the location as approximate location of the radio transmitter.

Embodiment 2

The method according to embodiment 1, further comprising causing storage of the identifier of the radio transmitter and the indication of the location in a database configured to store identifiers of a plurality of radio transmitters and a respectively associated indication of a location.

Embodiment 3

The method according to embodiment 1 or 2, further comprising causing storage of the indication of the received signal strength along with the location and the identifier of the radio transmitter.

Embodiment 4

The method according to any one of embodiments 1 to 3, wherein the notification of a user is caused
   only in case the received signal strength of radio signals of a single radio transmitter is determined to exceed a threshold at a current location of the mobile device; or
   only in case the received signal strength of radio signals of at least one radio transmitter of a single entity is determined to exceed a threshold at a current location of the mobile device; or
   in case the received signal strength of radio signals of at least one radio transmitter is determined to exceed a threshold at a current location of the mobile device.

Embodiment 5

The method according to any one of embodiments 1 to 4, wherein the map of the site is caused to be presented to a user with a segmentation into sub-areas.

Embodiment 6

The method according to embodiment 5, wherein:
sub-areas, for which an approximate location of at least one radio transmitter is still required, are pointed out on the display; and/or
sub-areas, for which a predetermined number of approximate locations of radio transmitters has already been stored, are pointed out on the display.

Embodiment 7

The method according to any one of embodiments 1 to 6, wherein the stored identifier of the radio transmitter and the stored indication of the location are made available
for a tracking of mobile devices at the site; or
for a calibration of a sensor-based tracking of mobile devices collecting fingerprints at the site.

Embodiment 8

The method according to any one of embodiments 1 to 7, wherein the at least one apparatus comprises one of
the mobile device; or
a component of the mobile device; or
a server receiving results of measurements from at least one mobile device; or
a component of a server receiving results of measurements from at least one mobile device.

Embodiment 9

The method according to any one of embodiments 1 to 8, wherein the identifier of the radio transmitter and the indication of the location are stored in a memory as a part of a plurality of identifiers of radio transmitters and associated indications of locations for the site, the method further comprising at a further mobile device:
receiving the plurality of identifiers of radio transmitters and associated indications of locations stored for the site;
calibrating a position of the further mobile device using an indication of a location associated with an identifier of a radio transmitter, if radio signals of the radio transmitter are received with a signal strength exceeding a threshold; and
using the calibrated position for a sensor-based tracking of the further mobile device.

Embodiment 10

The method according to embodiment 9, further comprising at the further mobile device:
assembling fingerprints, each fingerprint comprising results of measurements on radio signals at a respective location of measurement at the site and an indication of the respective location of measurement, wherein the respective location of measurement is based on the sensor-based tracking of the further mobile device; and
transmitting assembled fingerprints to a server.

Embodiment 11

An apparatus comprising means for causing performance of the actions of the method of any one of embodiments 1 to 7.

Embodiment 12

The apparatus according to embodiment 11, wherein the apparatus is:
a module for a mobile device; or
a mobile device; or
a module for a server; or
a server.

Embodiment 13

A system comprising an apparatus according to embodiment 11, wherein the apparatus is:
a server, the system further comprising a memory that is configured to store identifiers of radio transmitters and associated indications of locations and that is accessible to the server; or
a server, the system further comprising a mobile device providing results of measurements on radio signals at the site; or
a server, the system further comprising a mobile device configured to calibrate its location for a sensor-based tracking using a plurality of identifiers of radio transmitters and associated indications of locations made available by the server for the site; or
a mobile device, the system further comprising a server configured to cause storage of identifiers of radio transmitters and associated indications of locations provided by the mobile device; or
a mobile device, the system further comprising a server configured to cause storage of identifiers of radio transmitters and associated indications of locations provided by the mobile device, and a mobile device configured to calibrate its location for a sensor-based tracking using a plurality of identifiers of radio transmitters and associated indications of locations made available by the server for the site.

Embodiment 14

An apparatus comprising at least one processor and at least one memory, wherein the at least one memory includes computer program code, the at least one memory and the computer program code configured to, with the at least one processor, cause a device at least to:
obtain results of measurements of a mobile device on radio signals transmitted by a radio transmitter at a site, the results comprising at least an identifier of the radio transmitter and an indication of a received signal strength of the radio signals, wherein a plurality of radio transmitters are distributed at the site;
compare the received signal strength with a threshold; and
if the received signal strength exceeds the threshold:
cause a notification of a user of the mobile device;
obtain an indication of a location based on a user input identifying a location on a map of the site, the map presented on a display of the mobile device; and cause storage of the identifier of the radio transmitter and the indication of the location as approximate location of the radio transmitter.

Embodiment 15

The apparatus according to embodiment 14, wherein the at least one memory and the computer program code are further configured to, with the at least one processor, cause the device to cause storage of the identifier of the radio transmitter and the indication of the location in a database configured to store identifiers of a plurality of radio transmitters and a respectively associated indication of a location.

Embodiment 16

The apparatus according to embodiment 14 or 15, wherein the at least one memory and the computer program code are further configured to, with the at least one processor, cause the device to cause storage of the indication of the received signal strength along with the location and the identifier of the radio transmitter.

Embodiment 17

The apparatus according to any one of embodiments 14 to 16, wherein the notification of a user is caused
  only in case the received signal strength of radio signals of a single radio transmitter is determined to exceed a threshold at a current location of the mobile device; or
  only in case the received signal strength of radio signals of at least one radio transmitter of a single entity is determined to exceed a threshold at a current location of the mobile device; or
  in case the received signal strength of radio signals of at least one radio transmitter is determined to exceed a threshold at a current location of the mobile device.

Embodiment 18

The apparatus according to any one of embodiments 14 to 17, wherein the map of the site is caused to be presented to a user with a segmentation into sub-areas.

Embodiment 19

The apparatus according to embodiment 18, wherein the at least one memory and the computer program code are further configured to, with the at least one processor, cause the device to:
  point out sub-areas, for which an approximate location of at least one radio transmitter is still required, on the display; and/or
  point out sub-areas, for which a predetermined number of approximate locations of radio transmitters has already been stored, on the display.

Embodiment 20

The apparatus according to any one of embodiments 14 to 19, wherein the stored identifier of the radio transmitter and the stored indication of the location are made available
  for a tracking of mobile devices at the site; or
  for a calibration of a sensor-based tracking of mobile devices collecting fingerprints at the site.

Embodiment 21

The apparatus according to any one of embodiments 14 to 20, wherein the apparatus is one of:
  a module for a mobile device; or
  a mobile device; or
  a module for a server; or
  a server.

Embodiment 22

A system comprising an apparatus, the apparatus comprising at least one processor and at least one memory, wherein the at least one memory includes computer program code, the at least one memory and the computer program code configured to, with the at least one processor, cause a device at least to:
  obtain results of measurements of a mobile device on radio signals transmitted by a radio transmitter at a site, the results comprising at least an identifier of the radio transmitter and an indication of a received signal strength of the radio signals, wherein a plurality of radio transmitters are distributed at the site;
  compare the received signal strength with a threshold; and
  if the received signal strength exceeds the threshold:
    cause a notification of a user of the mobile device;
    obtain an indication of a location based on a user input identifying a location on a map of the site, the map presented on a display of the mobile device; and
    cause storage of the identifier of the radio transmitter and the indication of the location as approximate location of the radio transmitter;
  wherein the apparatus is:
    a server, the system further comprising a memory that is configured to store identifiers of radio transmitters and associated indications of locations and that is accessible to the server; or
    a server, the system further comprising the mobile device providing results of measurements on radio signals at the site; or
    a server, the system further comprising a mobile device configured to calibrate its location for a sensor-based tracking using a plurality of identifiers of radio transmitters and associated indications of locations made available by the server for the site; or
    the mobile device, the system further comprising a server configured to cause storage of identifiers of radio transmitters and associated indications of locations provided by the mobile device; or
    the mobile device, the system further comprising a server configured to cause storage of identifiers of radio transmitters and associated indications of locations provided by the mobile device, and a mobile device configured to calibrate its location for a sensor-based tracking using a plurality of identifiers of radio transmitters and associated indications of locations made available by the server for the site.

Embodiment 23

A computer program code, which is configured to cause a device to perform the actions of the methods of any one of embodiments 1 to 7 when executed by a processor.

Embodiment 24

A computer readable storage medium in which computer program code is stored, the computer program code causing a device to perform the following when executed by a processor:
obtain results of measurements of a mobile device on radio signals transmitted by a radio transmitter at a site, the results comprising at least an identifier of the radio transmitter and an indication of a received signal strength of the radio signals, wherein a plurality of radio transmitters are distributed at the site;
compare the received signal strength with a threshold; and
if the received signal strength exceeds the threshold:
cause a notification of a user of the mobile device;
obtain an indication of a location based on a user input identifying a location on a map of the site, the map presented on a display of the mobile device; and
cause storage of the identifier of the radio transmitter and the indication of the location as approximate location of the radio transmitter.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/ software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102, or processor 311 in combination with memory 312, or component 313 can also be viewed as means for obtaining results of measurements of a mobile device on radio signals transmitted by a radio transmitter at a site, the results comprising at least an identifier of the radio transmitter and an indication of a received signal strength of the radio signals, wherein a plurality of radio transmitters are distributed at the site; means for comparing the received signal strength with a threshold; and means for—if the received signal strength exceeds the threshold—causing a notification of a user of the mobile device, obtaining an indication of a location based on a user input identifying a location on a map of the site, the map presented on a display of the mobile device, and causing storage of the identifier of the radio transmitter and the indication of the location as approximate location of the radio transmitter.

The program codes in memory 102 and memory 312 can also be viewed as comprising such means in the form of functional modules.

FIGS. 2, 5 and 6 may also be understood to represent example functional blocks of computer program codes supporting a sensor-based tracking of mobile devices.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method performed by at least one apparatus, the method comprising:
obtaining a result of at least one measurement of one or more radio signals transmitted by a radio transmitter at a site, the result comprising an indication of a received signal strength of at least one of the one or more radio signals, wherein the at least one measurement is performed by a mobile device at the site;
determining that the received signal strength indicated in the result exceeds a threshold signal strength;
in response to determining that the received signal strength exceeds the threshold signal strength, causing the mobile device to output a notification requesting a location of the mobile device or of the radio transmitter to be identified, wherein the notification requesting the location of the mobile device or of the radio transmitter to be identified includes a map of the site with a segmentation into sub-areas; and determining an approximate location of the radio transmitter based on the location of the mobile device or of the radio transmitter that is identified via the mobile device after the notification is outputted.

2. The method according to claim 1, further comprising: storing, in a database, the approximate location of the radio transmitter.

3. The method according to claim 2, wherein the database is configured to store a plurality of radio transmitter locations for a radio map for position detection.

4. The method according to claim 1, further comprising: causing storage of the indication of the received signal strength along with the approximate location of the radio transmitter and an identifier of the radio transmitter.

5. The method according to claim 1, wherein the notification requesting the location of the mobile device or of the radio transmitter is caused only in case the received signal strength of at least one of the one or more radio signals of a single radio transmitter is determined to exceed the threshold signal strength at a current location of the mobile device; or only in case the received signal strength of at least one of the one or more radio signals of at least one radio transmitter of a single entity is determined to exceed the threshold signal strength at the current location of the mobile device; or in case the received signal strength of at least one of the one or more radio signals of at least one radio transmitter is determined to exceed the threshold signal strength at the current location of the mobile device.

6. The method according to claim 1, wherein:

sub-areas, for which an approximate location of at least one radio transmitter is still required, are pointed out on a display of the mobile device; and/or sub-areas, for which a predetermined number of approximate locations of radio transmitters has already been stored, are pointed out on the display of the mobile device.

7. The method according to claim 1, wherein the at least one apparatus comprises one of the mobile device; or a component of the mobile device; or server receiving results of measurements from at least one mobile device; or component of a server receiving results of measurements from at least one mobile device.

8. The method of claim 1, wherein the notification requesting a location of the mobile device or of the radio transmitter to be identified comprises the notification including a request to input the location of the mobile device or the of the radio transmitter by way of an interface feature displayed by the mobile device.

9. An apparatus comprising at least one processor and at least one memory, wherein the at least one memory includes computer program code, the at least one memory and the computer program code configured to, with the at least one processor, cause the apparatus at least to:

obtain a result of at least one measurement of one or more radio signals transmitted by a radio transmitter at a site, the result comprising an indication of a received signal strength of the one or more radio signals, wherein the at least one measurement is performed by a mobile device at the site;

determine that the received signal strength indicated in the result exceeds a threshold signal strength;

in response to the received signal strength exceeding the threshold signal strength, cause the mobile device to output a notification requesting a location of the mobile device or of the radio transmitter to be identified, wherein a map of the site is caused to be presented to a user with a segmentation into sub-areas; and determine an approximate location of the radio transmitter based on the location of the mobile device or of the radio transmitter that is identified via the mobile device after the notification is outputted.

10. The apparatus according to claim 9, wherein the at least one memory and the computer program code are further configured to, with the at least one processor, cause the apparatus to store, in a database, the approximate location of the radio transmitter.

11. The apparatus according to claim 9, wherein the at least one memory and the computer program code are further configured to, with the at least one processor, cause the apparatus to cause storage of the indication of the received signal strength along with the approximate location of the radio transmitter and an identifier of the radio transmitter.

12. The apparatus according to claim 9, wherein the notification requesting the location of the mobile device or of the radio transmitter to be identified is caused only in case the received signal strength of at least one of the one or more radio signals of a single radio transmitter is determined to exceed the threshold signal strength at a current location of the mobile device; or only in case the received signal strength of at least one of the one or more radio signals of at least one radio transmitter of a single entity is determined to exceed the threshold signal strength at a current location of the mobile device; or in case the received signal strength of at least one of the one or more radio signals of at least one radio transmitter is determined to exceed the threshold signal strength at a current location of the mobile device.

13. The apparatus according to claim 9, wherein the at least one memory and the computer program code are further configured to, with the at least one processor, cause the apparatus to:

indicate, by the mobile device, sub-areas, for which an approximate location of at least one radio transmitter is still required; and/or indicate, by the mobile device, sub-areas, for which a predetermined number of approximate locations of radio transmitters has already been stored.

14. The apparatus according to claim 9, wherein the apparatus is one of:

a module for a mobile device; or a mobile device; or a module for a server;

or a server.

15. The apparatus according to claim 9, wherein the notification requesting a location of the mobile device or of the radio transmitter to be identified comprises the notification including a request to input the location of the mobile device or the of the radio transmitter by way of an interface feature displayed by the mobile device.

16. A system comprising an apparatus, the apparatus comprising at least one processor and at least one memory, wherein the at least one memory includes computer program code, the at least one memory and the computer program code configured to, with the at least one processor, cause an apparatus at least to:

obtain a result of at least one measurement of one or more radio signals transmitted by a radio transmitter at a site, the result comprising at least an identifier of the radio transmitter and an indication of a received signal strength of the radio signals, wherein the at least one measurement is performed by a mobile device at the site;

determine that the received signal strength indicated in the result exceeds a threshold signal strength;

in response to the determination that the received signal strength exceeds the threshold signal strength, cause the mobile device to output a notification requesting a location of the mobile device or of the radio transmitter to be identified, wherein a map of the site is caused to be presented to a user with a segmentation into sub-areas;

determine an approximate location of the radio transmitter based on the location of the mobile device or of the radio transmitter that is identified via the mobile device after the notification is outputted; and store the location of the mobile device or of the radio transmitter identified via the mobile device as the approximate location of the radio transmitter.

17. The system of claim 16, wherein the apparatus is:
a server, the system further comprising a memory that is configured to store identifiers of radio transmitters and associated indications of locations and that is accessible to the server; or
a server, the system further comprising the mobile device providing results of measurements on radio signals at the site; or
a server, the system further comprising a mobile device configured to calibrate its location for a sensor-based tracking using a plurality of identifiers of radio transmitters and associated indications of locations made available by the server for the site; or
the mobile device, the system further comprising a server configured to cause storage of identifiers of radio transmitters and associated indications of locations provided by the mobile device; or
the mobile device, the system further comprising a server configured to cause storage of identifiers of radio transmitters and associated indications of locations provided by the mobile device, and a mobile device configured to calibrate its location for a sensor-based tracking using a plurality of identifiers of radio transmitters and associated indications of locations made available by the server for the site.

18. A non-transitory tangible computer readable storage medium in which computer program code is stored, the computer program code causing a device to perform the following when executed by a processor:
obtain a result of at least one measurement on one or more radio signals transmitted by a radio transmitter at a site, the result comprising at least an indication of a received signal strength of the one or more radio signals, wherein the at least one measurement is performed by a mobile device at the site;

determine that the received signal strength indicated in the result exceeds a threshold signal strength;

in response to the determination that the received signal strength exceeds the threshold signal strength, cause the mobile device to output a notification requesting a location of the mobile device or of the radio transmitter to be identified, wherein a map of the site is caused to be presented to a user with a segmentation into sub-areas; and determine an approximate location of the radio transmitter based on the location of the mobile device or of the radio transmitter that is identified via the mobile device after the notification is outputted.

* * * * *